United States Patent [19]
Field

[11] Patent Number: 4,620,403
[45] Date of Patent: Nov. 4, 1986

[54] NAILING ANCHOR AND METHOD OF USE

[76] Inventor: Gerald L. Field, 2907 Northeast 55th, #1, Seattle, Wash. 98105

[21] Appl. No.: 659,270

[22] Filed: Oct. 10, 1984

[51] Int. Cl.$^4$ ............................................. E04B 5/52
[52] U.S. Cl. ...................................... 52/480; 52/509; 52/715; 52/747
[58] Field of Search ................ 52/480, 715, 483, 509, 52/747

[56] References Cited

U.S. PATENT DOCUMENTS

| | | |
|---|---|---|
| 282,164 | 7/1883 | Chase . |
| 1,879,457 | 9/1932 | Paulsen . |
| 1,905,616 | 4/1933 | Zanella . |
| 2,008,192 | 7/1935 | Stubbs . |
| 2,066,813 | 1/1937 | Williams . |
| 2,281,519 | 4/1942 | Faber . |
| 2,620,705 | 12/1952 | Pdovinecz et al. . |
| 2,807,063 | 9/1957 | Berow . |
| 3,308,590 | 3/1967 | Ettore et al. . |
| 3,331,180 | 7/1967 | Vissing et al. . |
| 3,713,264 | 1/1973 | Morgan, Jr. ...................... 52/480 X |
| 4,052,831 | 10/1977 | Roberts et al. . |
| 4,117,644 | 10/1978 | Weinar . |
| 4,299,069 | 11/1981 | Neumann ......................... 52/509 X |
| 4,448,007 | 5/1984 | Adams . |

Primary Examiner—Carl D. Friedman
Attorney, Agent, or Firm—Seed and Berry

[57] ABSTRACT

A nailing anchor for use in fixedly attaching a series of parallel wooden boards to a transverse joist. The member has two flat, horizontal tabs each positionable between one of a pair of adjacent boards and the joist. The tabs are fixedly attached to a flat spacer body and extend perpendicularly therefrom in opposite directions. A hole in the one tab allows the anchor to be nailed to the joist. An elongated slot in the spacer body allows the anchor to be toe-nailed through the one adjacent board into the joist. A flat, triangular point depends perpendicularly from an upper edge of the spacer for fastening the one board to the spacer body.

23 Claims, 4 Drawing Figures

U.S. Patent   Nov. 4, 1986   4,620,403
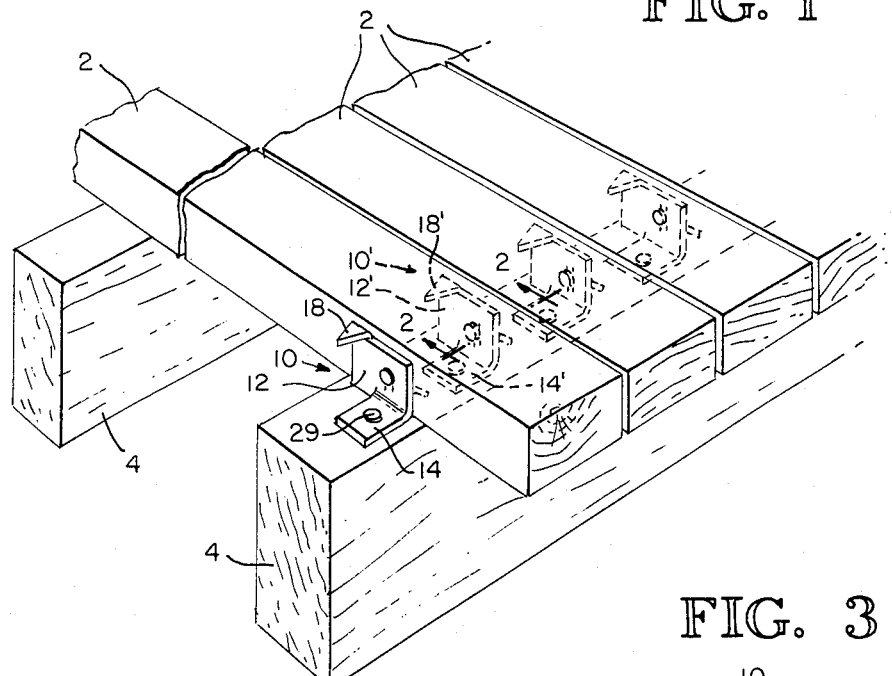
FIG. 1
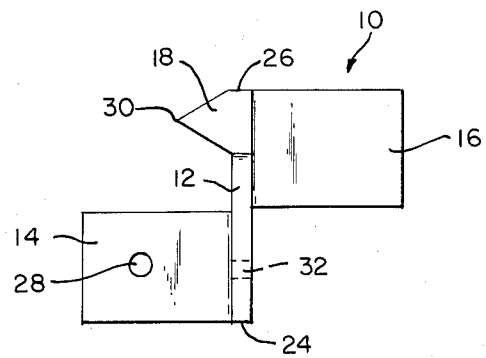
FIG. 3
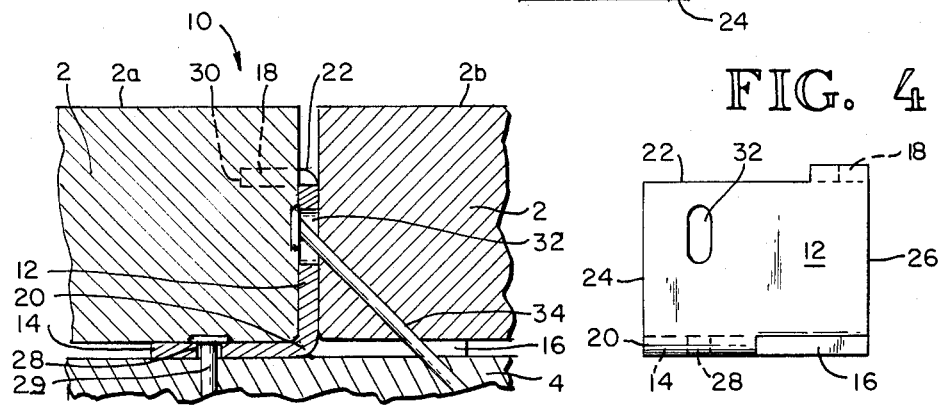
FIG. 2
FIG. 4

NAILING ANCHOR AND METHOD OF USE

DESCRIPTION

1. Technical Field

This invention pertains to nailing devices, and more particularly, to anchors for positioning and attaching a series of parallel wooden boards or slats to wooden joists or rails.

2. Background Art

Wooden decks or fences comprising two or more wooden joists or rails spanned by a series of parallel boards or slats nailed to the joists, are typically constructed by driving nails through the exposed face surface of the boards into the joists. This method is undesirable for several reasons. The exposed nailheads detract from the aesthetic appearance of the deck or fence. This condition is aggravated if the nails rust and discolor the wood. Misdirected hammer blows can damage the exposed surface of the boards when the boards are being nailed to the joists and the nails can split the boards. Finally, the nails used for decks are prone to working themselves out of the joists as the boards flex, such as when people walk on the deck. This can loosen the boards from the joists and raise the nailheads above the deck surface, causing a safety hazard.

It will therefore be appreciated that there has been a significant need for a nailing anchor and a method of using the anchor which is designed to overcome these problems and disadvantages. The present invention fulfills this need and further provides other related advantages.

DISCLOSURE OF THE INVENTION

The present invention resides in an anchoring device for attaching a series of parallel boards, to a transverse member or joist, comprising a spacer positioned between adjacent boards with a lower edge adjacent to the joist, two tabs fixedly attached and extending perpendicularly from the lower edge of the spacer in opposite directions, and a point fixedly attached to and extending perpendicularly from the spacer. The spacer is a flat, substantially rectangular element having an opening for fixedly attaching by toe-nailing the anchoring device to the adjacent board and the joist. The toe-nailing opening in the spacer is elongated, with a longer dimension oriented transverse to the board.

A tie-down opening is provided through the first tab for fixedly attaching the anchoring device to the joist. The first flat tab extends along the lower edge of the spacer from a first side edge of the spacer to a point substantially midway between the first side edge and a second opposite side edge of the spacer. The second flat tab extends along the lower edge of the spacer from the second side edge of the spacer to a point midway between the second and first side edges of the spacer. The toenailing opening in the spacer is positioned substantially midway between the first side edge of the spacer and the midway point of the first and second side edges.

The point is a flat, substantially triangular element extending in the direction of the first tab from an upper edge of the spacer. The point is positioned at the upper edge of the spacer laterally offset from the toe-nailing and tie-down openings.

Other features and advantages of the invention will become apparent from the following detailed description, taken in conjunction with the accompanying drawings.

BRIEF DESCRIPTION OF THE DRAWINGS

FIG. 1 comprises a front isometric view of a wooden deck constructed using an anchoring device of the present invention.

FIG. 2 is a cross-sectional side elevational view of the anchoring device of FIG. 1, showing the positions of the anchoring device, boards, joists, and nails.

FIG. 3 is a top plan view of the anchoring device of FIG. 1.

FIG. 4 is a rear elevational view of the anchoring device of FIG. 1.

BEST MODE FOR CARRYING OUT THE INVENTION

As best shown in FIG. 1, a flat wooden surface, such as a deck or fence, can be constructed from a series of parallel boards or slats 2 spanning transversely between two or more parallel oriented joists 4, with adjacent boards separated by a nailing anchor 10 of the present invention. The nailing anchor 10 comprises a spacer body 12, first and second oppositely projecting tabs 14 and 16, and a point 18 projecting in the direction of the first tab.

For purposes of convenience, the nailing anchor 10 will be described herein with respect to use in the construction of a horizontally oriented deck. It is to be understood that the nailing anchor 10 may also be used to construct vertically oriented fences or in any other construction requiring attachment of a plurality of spaced boards or slats to joists, rails or the like.

As best seen in FIG. 2, the spacer body 12 is vertically oriented and comprises a flat, substantially rectangular element having two flat surfaces for contacting opposing edge surfaces of two adjacent boards 2a and 2b, a lower edge 20 positioned adjacent to the joist 4, and an opposite upper edge 22. Thickness of the spacer body 12 is sized to the preselected spacing desired between the boards 2a and 2b.

The first tab 14 projects horizontally from a front side of the spacer body 12 and comprises a flat, substantially rectangular element fixedly depending from the lower edge 20 of the spacer body. As shown in FIG. 3, the first tab 14 laterally extends from a first outside edge 24 of the spacer body 12 to substantially midway between the first outside edge and an opposing second outside edge 26 of the spacer body. A tie-down hole 28 is provided in the first tab 14. The tie-down hole 28 allows the nailing anchor 10 to be fixedly attached to the joist 4 therebelow by driving a nail 29 through the hole into the joist.

The second tab 16 projects horizontally from a rear side of the spacer body 12 and comprises a flat, substantially rectangular element fixedly depending from the lower edge 20 of the spacer body. The first and second tabs 14 and 16 are generally oriented coplanar and extend from the spacer body 12 in opposite directions. The first and second tabs 14 and 16 are positioned under the boards 2a and 2b, respectively, when the deck is assembled. Should one or both of the tabs be slightly bent at an angle so as not to be coplanar, the weight of the boards or people walking on the boards, or the force used to install the nailing anchor 10 will tend to bend the tabs into coplanar alignment. The second tab 16 laterally extends from the second outside edge 26 of the spacer body 12 to substantially midway between the first and second outside edges 24 and 26.

The point 18 projects horizontally from the front side of the spacer body 12 and comprises a flat, substantially triangular element fixedly depending from the upper edge 22 of the spacer body. The point 18 is oriented generally parallel to the first tab 14 and terminates in a free pointed end 30. The point 18 extends laterally from the second outside edge 26 of the spacer body 12 substantially one-fourth the distance to the first outside edge 24.

As shown in FIG. 4, a toe-nail slot 32 is provided through the spacer body 12. The toe-nail slot 32 is positioned substantially midway between the lower and upper edges 20 and 22 of the spacer body 12 and substantially one-fourth the distance from the first outside edge 24 toward the second outside edge 26. The toe-nail slot 32 is thus positioned above the first tab 14 and laterally distant from both the point 18 and the second tab 16. The toe-nail slot 32 is elongated with the longer of the slot dimension oriented generally perpendicularly to the lower edge 20 of the spacer body 12 and the joist 4. The elongation of the toe-nail slot 32 allows a nail 34 to extend through the spacer body 12 and be driven at an angle downwardly into the edge surface of the board 26 and therethrough into the joist 4. Due to the lateral positioning of the second tab 16, the nail 34 can be driven through the toe-nail slot 32 for toe nailing without contacting the second tab. Furthermore, the likelihood of a hammer blow missing the nail 34 and hitting the point 18 is reduced.

Referring again to FIG. 1, the nailing anchor 10 is used in the following manner in the construction of a wooden deck. A previously fixed nailing anchor 10' is attached to the joist 4. A board 2 is placed adjacent the previous nailing anchor 10'. The lower surface of the board 2 is positioned adjacent to and above the first tab 14' with a first edge surface of the board contacting the point 18'. The board 2 is then hammered on an opposite exposed second edge surface to move the board toward the fixed nailing anchor 10' until the point 18' is fully embedded in the board and the first edge surface of the board contacts the spacer body 12'. The lower surface of the board 2 is held elevated above the joist 4 by the first tab 14'.

Another nailing anchor 10 is then positioned on the joist 4 with the second tab 16 of the anchor between the board 2 and the joist. The nailing anchor 10 is slipped toward the board 2 to place the spacer body 12 substantially flat against the exposed second edge surface of the board. It is noted that the tabs 14 and 16 hold the adjacent boards 2 of the deck at the same elevation to provide a level deck surface. The nailing anchor 10 is attached to the joist 4 by driving the nail 29 through the tie-down hole 28 into the joist. Since the point 18 of the nailing anchor 10 is laterally offset from the first tab 14, the likelihood of a hammer blow missing the nail 29 and hitting the point is reduced.

The nailing anchor 10 is then toe-nailed to the joist 4 by driving the nail 34 angularly downward through the toe-nail slot 32 into and through the second edge surface of the board 2 and into the joist 4. The head of the nail 34 can then be flattened against the spacer body 12, minimizing the effect of misspacing the next board from the spacer as a result of the projecting nail head. The above-described steps may now be repeated for the next board 2 used in constructing the deck.

When a deck or fence is constructed using the nailing anchor 10 of the present invention, the spacer body 12 provides a uniform separation between the parallel boards 2 of the deck without time-consuming measurements and alignment being required. Moreover, no nails are driven through the face surface of the boards 2, and no nail heads are exposed to view. Accidental striking of the face of the boards 2 with a hammer which mars the boards, is avoided. The aesthetic appearance of the deck or fence is enhanced and the time required to construct the project reduced.

Construction of a deck using the nail anchor 10 of this invention proceeds rapidly and needs little construction skill on the part of the installer, because uniform spacing of the parallel boards is maintained by the spacer body 12 of the anchor. The step of measuring the spacing between adjacent boards and carefully aligning each board is avoided.

The point 18 prevents the first edge surface of each board 2 from lifting away from the joist 4 and inhibits its lateral movement. The toe-nail 34 driven through the toe-nail slot 32 prevents lifting of the opposite second edge surface of each board 2 and also inhibits lateral movement. The nailing of the first tab 14 to the joist 4 using the tie-down hole 28 provides a rigid attachment of the nailing anchor 10 to the joist. In combination, the point 18, the tie-down hole 28 and the toe-nail slot 32 ensure a rigid connection between the boards 2 and the joist 4.

The nailing anchor 10 is fabricated from a material having a thickness sufficient to provide a desirable rigidity for the anchor and preset the spacing between the boards. The anchor can be fabricated from any metal, although galvanized steel or aluminum is preferred. In the presently preferred embodiment of the invention, the first and second tabs 14 and 16 and the point 18 are formed as an integral unit with the spacer body 12.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. An anchoring device for use in attaching a series of substantially parallel boards to a generally transversely oriented member, comprising:

a spacer member for separating a pair of adjacent boards by a predetermined distance, the spacer member having a toe-nailing slot for toe-nailing the spacer member to the one adjacent board and the transverse member;

a first tab fixedly attached to a first end portion of the spacer member and projecting generally perpendicularly therefrom for positioning between the other adjacent board and the transverse member, the first tab having a tie-down aperture for fixedly attaching the first tab to the transverse member;

a second tab fixedly attached to the first end portion of the spacer member and projecting generally perpendicularly therefrom in a direction opposite the first tab for positioning between the one adjacent board and the transverse member; and a grasping member fixedly attached to an opposite second end portion of the spacer member and projecting generally perpendicularly therefrom in the same general direction as the first tab for embedding into the other adjacent board and holding the board stationary.

2. The anchoring device of claim 1 wherein the second tab is laterally offset from the toe-nailing slot.

3. The anchoring device of claim 1 wherein the grasping member is laterally offset from the toe-nailing slot.

4. The anchoring device of claim 1 wherein the spacer member has a flat spacer portion with a thickness corresponding to the predetermined distance between the adjacent boards for holding the boards apart by the predetermined distance.

5. An anchoring device for use in attaching a series of parallel boards to a generally transversely oriented member, comprising:
   a spacer member for separating a pair of adjacent boards by a predetermined distance;
   spacer member attachment means for fixedly attaching the spacer member to the one adjacent board and the transverse member, said attachment means including a nailing aperture for toe-nailing through the anchoring device to the one adjacent board and the transverse member;
   a tie-down member fixedly attached to the spacer member and projecting generally perpendicularly therefrom for positioning between the other adjacent board and the transverse member;
   tie-down member attachment means for fixedly attaching the tie-down member to the transverse member; and
   an engagement member fixedly attached to the spacer member and projecting generally perpendicularly therefrom in the same general direction as the tie-down member for engaging and holding stationary the other adjacent board.

6. The anchoring device of claim 5, further including a second spacer member fixedly attached to the first spacer member and projecting generally perpendicularly therefrom in a direction opposite the tie-down member for positioning between the one adjacent board and the transverse member and holding the one adjacent board at a distance from the transverse member corresponding to the distance the tie-down member holds the other board away from the transverse member.

7. The anchoring device of claim 5 wherein the tie-down member is a substantially flat plate member, and the tie-down member attachment means is a hole extending through the plate for receiving a nail to hold the plate stationary with respect to the transverse member.

8. The anchoring device of claim 7 wherein the tie-down hole is laterally offset from the engagement member.

9. The anchoring device of claim 5 wherein the engagement member is a flat, substantially triangular member.

10. The anchoring device of claim 5 wherein the spacer member attachment means is a slot in the spacer member positioned and sized to receive a nail for toe-nailing the spacer member to the one adjacent board and the transverse member.

11. The anchoring device of claim 10 wherein the toe-nailing slot is laterally offset from the engagement member.

12. The anchoring device of claim 5 wherein the spacer member attachment means is a slot in the spacer member positioned and sized to receive a nail for toe-nailing the spacer member to the one adjacent board and the transverse member, and the anchoring device further includes a second spacer member fixedly attached to the first spacer member and projecting generally perpendicularly therefrom in a direction opposite the tie-down member for positioning between the one adjacent board and the transverse member and holding the one adjacent board at a distance from the transverse member corresponding to the distance the tie-down member holds the other board laterally offset from the toe-nailing slot.

13. The anchoring device of claim 5 wherein the tie-down member projects outwardly from an edge portion of the spacer member toward the transverse member.

14. The anchoring device of claim 13 further including a second spacer member fixedly attached to the first spacer member and projecting generally perpendicularly therefrom in a direction opposite the tie-down member for positioning between the one adjacent board and the transverse member and holding the one adjacent board at a distance from the transverse member corresponding to the distance the tie-down member holds the other board away from the transverse member, the second spacer member projects outwardly from the edge portion of the spacer member toward the transverse member.

15. The anchoring device of claim 14 wherein the engagement member projects outwardly from an edge portion of the spacer member away from the transverse member.

16. An anchoring device for use in attaching a plurality of members in substantially parallel relation to a generally transversely oriented support, comprising:
   spacer means for providing a preset gap between a pair of adjacent members;
   anchoring means for fixedly attaching the anchoring devise to the transverse support;
   first fastening means for fixedly attaching the anchoring device to at least one of the adjacent members; and
   second fastening means for fixedly attaching the anchoring device to the other of the adjacent members, said second fastening means including a nailing aperture means for toe-nailing through the anchor device to the other of the adjacent boards and the transverse member.

17. The anchoring device of claim 16 wherein the spacer means comprises a plate having a thickness corresponding to the gap and positioned between the adjacent members, the plate being fixedly attached to the anchoring means.

18. The anchoring device of claim 17 wherein the first fastening means includes a projecting member for embedding in and grasping one of the adjacent members.

19. The anchoring device of claim 18 wherein the spacer means comprises a plate having a thickness corresponding to the gap and the nailing aperture means is a slot in the plate oriented generally transverse to the transverse support.

20. The anchoring device of claim 16 wherein the anchoring means includes a substantially flat member fixedly attached to the spacer means for positioning between the one adjacent board and the transverse support, and means for attaching the flat member to the transverse support.

21. The anchoring device of claim 20 wherein the means for attaching the flat member to the transverse support is an aperture extending through the flat member.

22. The anchoring device of claim 20 wherein the further including a second substantially flat member fixedly attached to the spacer means for positioning between the other adjacent board and the transverse support.

23. A method for anchoring a plurality of boards in substantially parallel relation to a generally transversely oriented member using an anchoring device having a spacer member with a slot, a first tab fixedly attached to a first end portion of the spacer member and projecting generally perpendicularly therefrom with a tie-down hole, a second tab fixedly attached to the first end portion of the spacer member laterally offset from the first tab, and projecting generally perpendicularly therefrom in a direction opposite the first tab, and a grasping member fixedly attached to an opposite second end portion of the spacer member and projecting therefrom in the same general direction as the first tab, comprising:

positioning the second tab between the transverse member and a first board fixedly attached to the transverse member, and moving the spacer member into juxtaposition with the edge face of the first board;

driving a nail angularly through the slot into and through the edge face of the first board and into the transverse member in a toe-nailing manner to fixedly attach the spacer member to the first board and the first board to the transverse member;

driving a nail through the tie-down hole in the first tab to fixedly attach the first tab to the transverse member;

moving a second board toward the spacer member to position the first tab between the second board and the transverse member; and driving the second board toward the spacer member to embed the grasping member in the edge face of the second board and move the edge face of the second board into juxtaposition with the spacer member.

* * * * *